Jan. 16, 1951     F. S. THOMAS, JR     2,538,175
MOTOR MOUNT CONSTRUCTION
Filed April 30, 1948     2 Sheets—Sheet 1
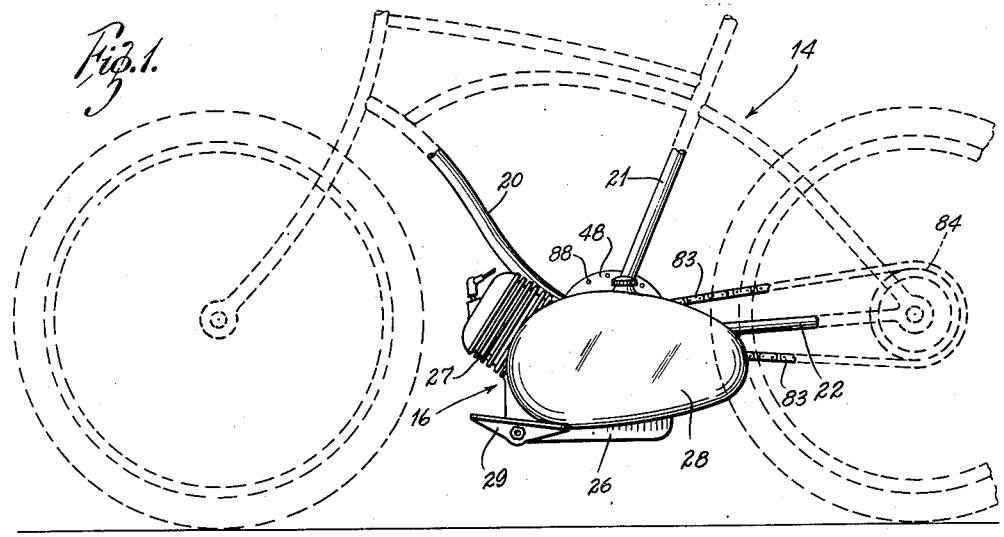
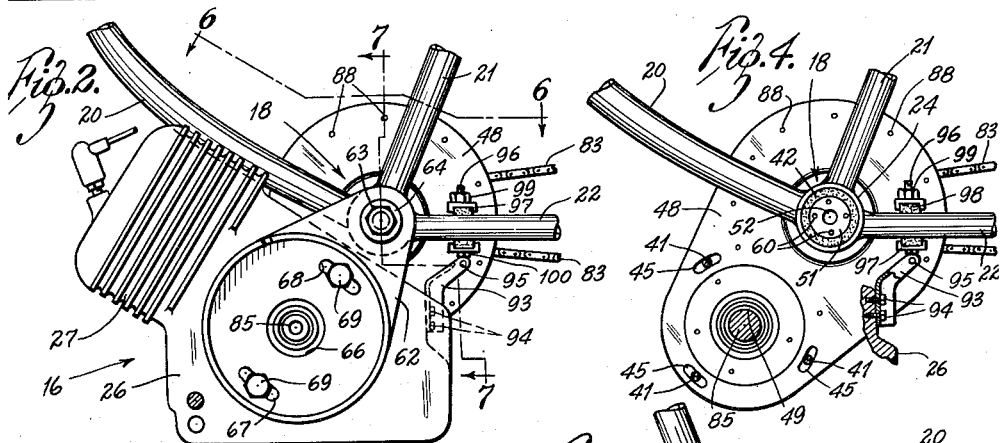
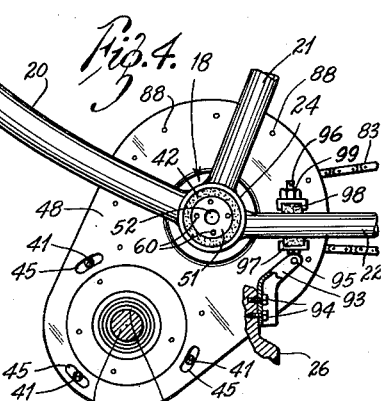
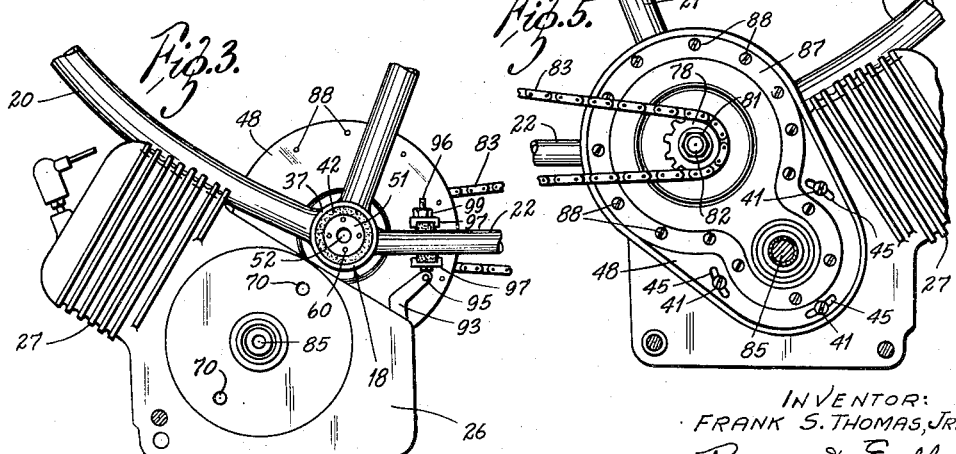
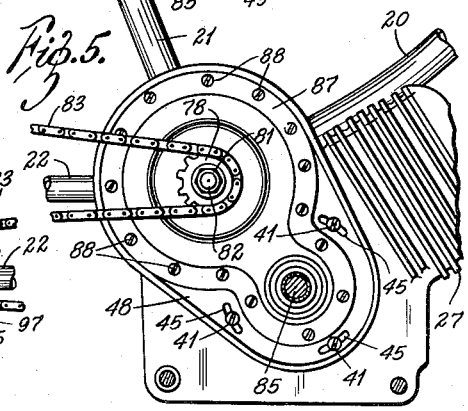
INVENTOR:
FRANK S. THOMAS, JR.
By Rogers & Ezell,
ATTORNEYS.

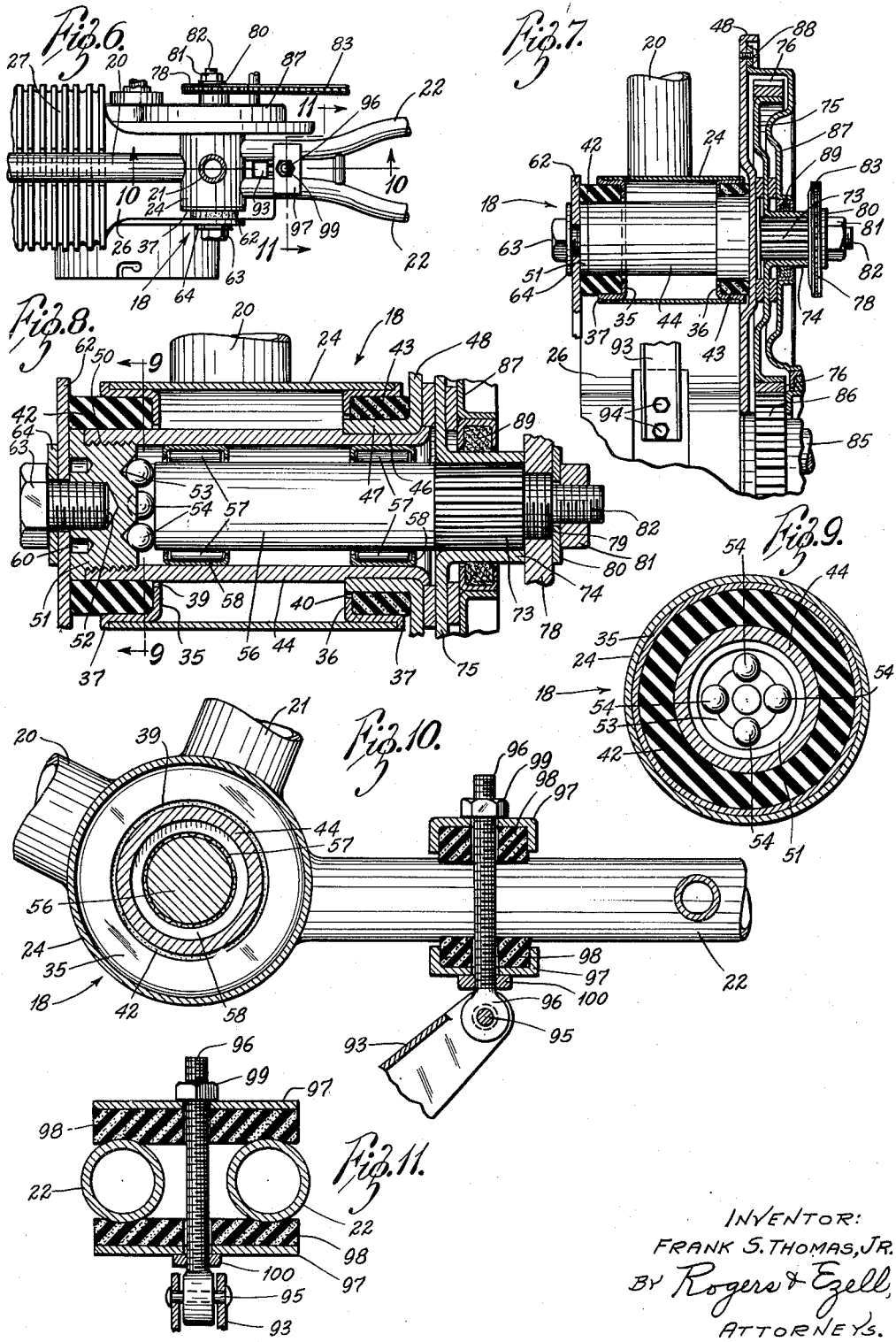

Patented Jan. 16, 1951

2,538,175

UNITED STATES PATENT OFFICE 2,538,175

MOTOR MOUNT CONSTRUCTION

Frank S. Thomas, Jr., St. Louis, Mo., assignor to Development Corporation, Inc., St. Louis, Mo., a corporation of Missouri Application April 30, 1948, Serial No. 24,239

10 Claims. (Cl. 180—33)

1

The present invention relates generally to motorized bicycles, and more particularly to a mount construction for securing a motor unit in suspended position on a bicycle frame.

The present invention is a further development of the mount construction disclosed and claimed in my copending application, Serial No. 705,510, filed October 25, 1946.

An object of the present invention is to provide a novel mount construction for suspending a motor unit from a bicycle frame.

Another object is to provide a novel mount construction for suspending a motor unit from a bicycle frame by means of which the motor may be secured in place without modification of the bicycle frame, and which provides for relatively wide adjustability in the location of such motor unit.

Another object is to provide a novel mount for suspending a motor unit from a bicycle frame by which the motor unit may be adjusted to snugly fit the riser rod of the frame regardless of its configuration.

Other objects are to provide a novel mount construction for suspending a motor unit from a bicycle frame by which motor vibrations are substantially absorbed, in which the motor unit is rigidly supported from the strongest point of the bicycle frame, which is readily applied to any type of bicycle incorporating the usual sprocket housing, which is efficient in performing its intended functions, which is adapted to serve over an extended period of time with minimum maintenance, and which is of sturdy, simple, inexpensive construction.

The foregoing and other objects and advantages are apparent from the following description taken with the accompanying drawings, in which:

Fig. 1 is a side elevational view of a motor unit suspended from a bicycle frame through a mount construction incorporating the teachings of the present invention, only a portion of the bicycle frame being shown in full lines;

Fig. 2 is an enlarged fragmentary side elevational view of the motor unit and mount construction of Fig. 1, the gasoline tank and foot pedal being removed for purposes of clarity;

Fig. 3 is a fragmentary view similar to Fig. 2, partly in side elevation and partly in vertical cross section;

Fig. 4 is a view similar to Fig. 3, but with the motor removed;

Fig. 5 is a view similar to Fig. 2, looking at the

2 other side thereof, the kick starter being omitted for clarity;

Fig. 6 is a cross-sectional view on the line 6—6 of Fig. 2, showing the several parts, with the exception of the vertical frame bar, in plan;

Fig. 7 is an enlarged cross-sectional view on substantially the line 7—7 of Fig. 2;

Fig. 8 is an enlarged vertical transverse cross-sectional view through the present mount construction in position in the bicycle pedal crank housing;

Fig. 9 is a cross-sectional view on substantially the line 9—9 of Fig. 8;

Fig. 10 is an enlarged cross-sectional view on substantially the line 10—10 of Fig. 6; and Fig. 11 is an enlarged cross-sectional view on substantially the line 11—11 of Fig. 6.

Referring to the drawings more particularly by reference numerals, 14 indicates generally a bicycle which supports a motor unit 16 through means of a mount construction 18 constructed in accordance with the teachings of the present invention. The bicycle 14 includes the usual riser bar 20, vertical bar 21, and forked horizontal bars 22, all of which extend radially from a cylindrical pedal crank housing 24.

The motor 16 includes a crankcase 26 with an integral cylinder 27, a gas tank 28, foot pedals 29, and other elements making up the complete motor unit, some of which are more particularly referred to below and others of which are more particularly referred to in my copending application for Kick Starter, Serial No. 24,352, filed April 30, 1948.

More specifically considering Figs. 6 through 10, it is to be observed that the present mount construction 18 is supported by the cylindrical housing 24 which normally supports the usual pedal crank. Pressed cup-shaped washers 35 and 36 are press-fitted into the housing 24, one at each end, as is clearly shown in Fig. 8, each of which includes a peripheral flange 37 which engage the edges of the housing 24. The washers 35 and 36 include large central openings 39 and 40, respectively. A ring 42 of resilient material, such as hard rubber, is supported within the pressed washer 35 and a similar ring 43 of smaller dimensions is supported within the washer 36. A tube 44 extends through the housing 24 and is supported at one end in the ring 42. At its other end the tube 44 receives in a shallow annular groove 46 an annular flange 47 of a backplate 48, the tube being peened outwardly radially to maintain the backplate 48 in position. The flange 47 is supportedly received by the ring 43. The backplate 8 is best shown in Fig. 4 and is of teardrop configuration. The flange 47 is centrally of the larger portion of the backplate 48, and centrally of the smaller portion thereof is an opening 49 radially from which are arcuate slots 45. Studs 41 pass through these slots 45 into threaded wells in the crankcase 26.

At its end supported by the ring 42, the tube 44 has internal threads 50 which threadedly receive a plug 51 having a centrally located threaded well 52. The plug 51 is also formed with an annular race 53 of V cross section in its inner face. The race 53 receives ball bearings 54, four being shown, which are abutted in end thrust relation by a stub driven shaft 56 mounted for rotation in spaced series of roller bearings 57 trapped in the usual manner in races 58 supported within the tube 44. The plug 51 includes tool-receiving wells 60 adjacent the threaded well 52. A motor support plate 62, best shown in Fig. 2 as to configuration, is mounted against the plug 51 and the ring 42 by means of a threaded stud 63 received in the well 52. A washer 64 is disposed between the plate 62 and the head of the stud 63.

The plate 62 is also of teardrop form and includes an opening 66 centrally of the enlarged portion thereof. Concentrically of the opening 66 are diametrically opposed slots 67 and 68, two being shown by way of illustration, which are arcuate and on the same radius about the said opening 66. Threaded studs 69 (Fig. 2) extend through the arcuate slots 67 and 68 into the threaded wells 70 (Fig. 3) in the side of the crankcase 26 of the motor unit 16. Manifestly, the motor unit 16 may be adjusted about the opening 66 to bring the cylinder 27 into snug relationship with the riser bar 20 of the bicycle 14, regardless of the particular shape of the riser bar 20.

The right end of the shaft 56 is longitudinally splined at 73, as is clearly indicated in Fig. 7, and receives in secured relation the flanged hub 74 of a gear stamping 75 which has peripheral teeth 76 welded or otherwise secured thereto. A sprocket 78 is threaded onto a reduced threaded portion 79 of the shaft 56 and is maintained in a secured position by a washer 80 and a nut 81, the latter being threaded onto a further reduced portion 82. The sprocket 78 receives a chain 83 which also passes around the usual rear wheel sprocket 84 indicated in dotted lines in Fig. 1.

The gear teeth 76 mesh with a gear 86 driven by the motor of the motor unit 16 and secured to the crankshaft 85 thereof. A cover plate 87 of the form clearly shown in Figs. 5 and 7 is secured by suitable screws 88 to the backplate 48. The cover plate 87 includes an opening which receives an encased sealing ring 89 which engages the hub flange 74 of the gear stamping 75 to prevent dust and dirt from entering the space between the backplate 48 and the cover plate 87.

As is clear from Figs. 2, 6, 10 and 11, a bracket 93 is secured by suitable studs 94 to the rear of the crankcase 26. At its upper end, the bracket 93 is pivotally connected by a pin 95 to the head of an eye-bolt 96 which extends through suitable openings in spaced channel-shaped members 97 disposed above and below the horizontal bars 22 of the bicycle 14 and which is threaded along the full length thereof. A resilient block member 98 is disposed in each channel-shaped member 97 and abuts the bars 22. The eye-bolt 96 extends between the bars 22, and it is manifest that the position of the channel-shaped members 97 and their enclosed resilient members 98 may be adjusted along the bars 22 to properly anchor or steady the crankcase 26. Cooperating nuts 99 and 100 provide for vertical adjustment of the eye-bolt 96.

It is manifest from the foregoing that the motor support plate 62 and the backplate 48 cooperate to support the motor unit 16 in snug suspended position, particularly in respect to the riser bar 20 of the bicycle 14. Adjustment of the motor unit 16 about the axis of the shaft 56 through loosening the nut 81 and the eye-bolt 96 may be readily effected which supplements the just mentioned adjustment. The present supporting construction disposes the motor unit 16 at the strongest point in the frame of the bicycle 14 and in a position to achieve a low center of gravity for the motorized bicycle, and places the added elements out of the way of the rider. The power take-off sprocket 78 for the bicycle chain 83 is disposed in substantially the same position as is the standard bicycle drive sprocket.

Manifestly, there has been provided a mount construction which fulfills the objects and advantages sought therefor.

It is to be understood that the foregoing description and the accompanying drawings have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. In combination with a bicycle frame including a pedal crank housing, of a mount construction for suspending a motor unit from the bicycle frame including a pair of plates, and means supporting said plates in parallel relation and at opposite sides of said housing, a member connected to both plates, said member being disposed in and supported by said housing.

2. In combination with a bicycle frame including a pedal crank housing, of a mount construction for suspending a motor unit from the bicycle frame including a pair of plates, and means supporting said plates in parallel relation and at opposite sides of said housing, said supporting means being disposed in and supported by said housing, said plates including means to receive and adjustably suspend a motor unit below the bicycle frame.

3. In combination with a bicycle frame including a pedal crank housing, of a mount construction for suspending a motor unit from the bicycle frame including a pair of plates, and means supporting said plates in parallel relation and at opposite sides of said housing, said supporting means being disposed in and supported by said housing, said plates including means to receive and adjustably suspend a motor unit below the bicycle frame, said plates being adjustable about the axis of the supporting means.

4. Mount construction for suspending a motor unit from a bicycle frame comprising a pair of plates, means for supporting said plates from the pedal crank housing of a bicycle frame, said plates including means to receive and adjustably suspend a motor unit below a bicycle frame, and additional anchoring means between the motor unit and the bicycle frame.

5. Mount construction comprising, in combination with the pedal crank housing of a bicycle, a sleeve, means supporting said sleeve in axial spaced relation within said housing, a motor support member, means supporting said member from said sleeve at one end of said housing, a backing member, and means supporting said backing member on said sleeve at the other end of said housing, said members being in opposed parallel relation and depending from the housing, said members including means for adjustably receiving a motor unit in suspended position.

6. Mount construction comprising, in combination with the pedal crank housing of a bicycle, a sleeve, means supporting said sleeve in axial spaced relation within said housing, including vibration absorbing elements between the sleeve and the housing, a motor support member, means supporting said member from said sleeve at one end of said housing, a backing member, and means supporting said backing member on said sleeve at the other end of said housing, said members being in opposed parallel relation and depending from the housing, said members including means for adjustably receiving a motor unit in suspended position.

7. Mount construction comprising, in combination with the pedal crank housing of a bicycle, a sleeve, means supporting said sleeve in axial spaced relation within said housing, a motor support member, means supporting said member from said sleeve at one end of said housing, a backing member, means supporting said backing member on said sleeve at the other end of said housing, said members being in opposed parallel relation and depending from the housing, said members including means for adjustably receiving a motor unit in suspended position, and a driven shaft rotatably supported within said sleeve.

8. In combination, a motor unit adapted to be attached to a bicycle frame, and a plate connected to each side of said motor unit, said plates being in parallel relation, said plates extending beyond the body of said motor unit and being securable at opposite ends of a bicycle frame pedal crank housing.

9. In combination, a motor unit adapted to be attached to a bicycle frame, and a plate adjustably connected to each side of said motor unit, said plates being in parallel relation, said plates extending beyond the body of said motor unit and being securable at opposite ends of a bicycle frame pedal crank housing.

10. Mount construction comprising, in combination with the pedal crank housing of a bicycle, a sleeve, means supporting said sleeve in axial spaced relation within said housing, including vibration absorbing elements between the sleeve and the housing, a motor support member, means supporting said member from said sleeve at one end of said housing, a backing member, and means supporting said backing member on said sleeve at the other end of said housing, said members being in opposed parallel relation and depending from the housing, said members including means for receiving a motor unit in suspended position.

FRANK S. THOMAS, Jr.

REFERENCES CITED

The following references are of record in the file of this patent:

FOREIGN PATENTS

| Number | Country | Date |
|---|---|---|
| 141,906 | Great Britain | Apr. 29, 1920 |
| 534,366 | France | Jan. 4, 1922 |
| 424,458 | Great Britain | Feb. 21, 1935 |